April 18, 1933.  A. HANIQUE  1,904,223
MACHINE FOR ASCERTAINING THE VOLUME OF LOADS OF GRANULAR MATERIAL
Filed Aug. 26, 1931
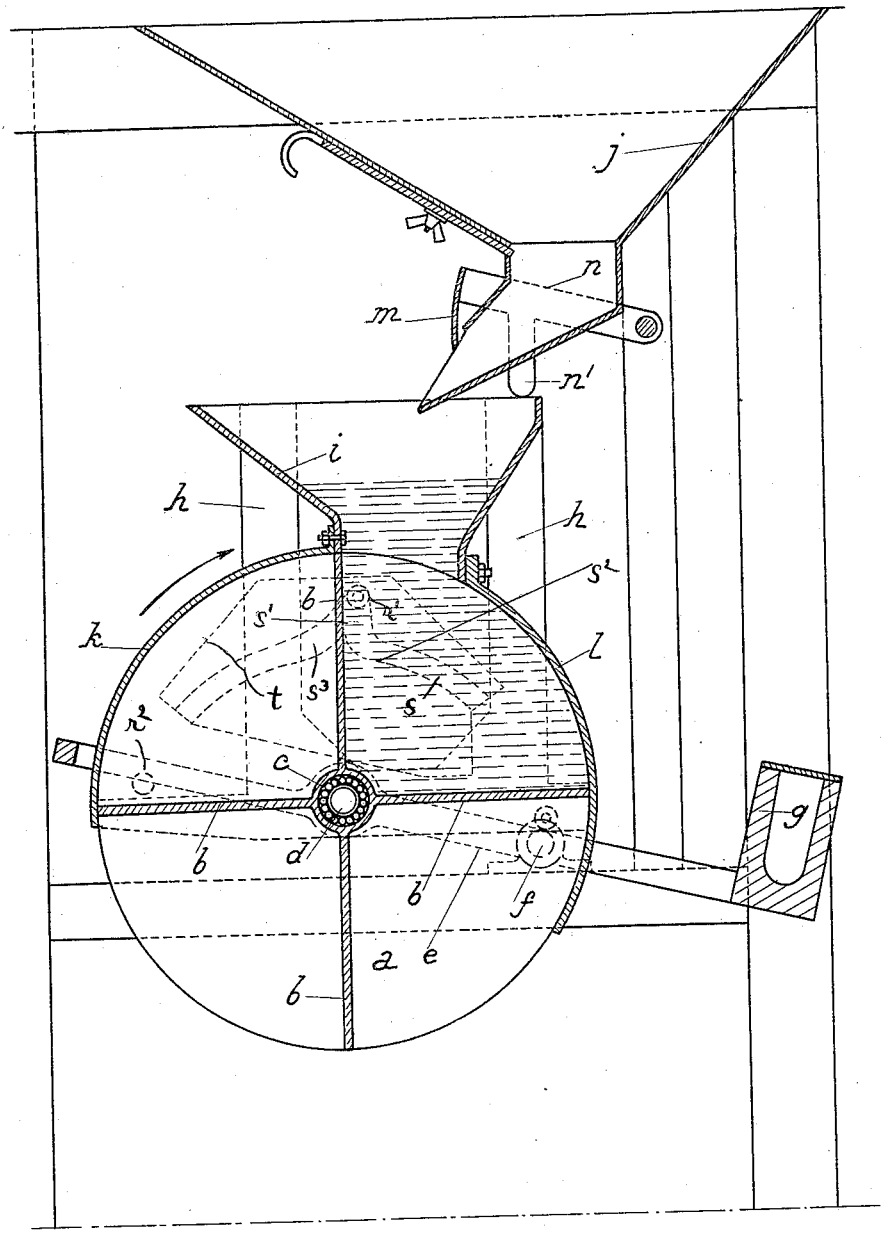
Inventor
Alfred Hanique.
By William C. Linton
Attorney.

Patented Apr. 18, 1933

1,904,223

UNITED STATES PATENT OFFICE

ALFRED HANIQUE, OF PARIS, FRANCE

MACHINE FOR ASCERTAINING THE VOLUME OF LOADS OF GRANULAR MATERIAL

Application filed August 26, 1931, Serial No. 559,565, and in France March 27, 1931.

Machines for ascertaining the volume of loads of granular material are known which comprise a rotary measuring drum divided into a plurality of compartments or buckets which are filled in succession from a compensating hopper and are emptied in succession when the granular load filling one compartment causes the arrangement to be released and then to rotate. In such apparatuses, the compartments of the measuring drum are each provided on the periphery of the drum with a gate which is held closed during the filling of the compartment and opens for the emptying thereof and abuts against dampers. By reason of the large size of these gates and of the weight of the load carried by them, their sudden opening and the consequent movements cause a shaking of the machine and provide exaggerated strains on the trunnions or axes of these gates which may thus be broken.

My invention has for its object an improved machine wherein the gates of the measuring drum and the damping stops are done away with, the compartments of the drum being quite open on their periphery. This peripheric open part is however covered by two incurved flanges disposed on either side of the drum in lieu of the previously used movable gates and leaving on their upper side a free passage for the loading and on their lower side an unloading opening. These incurved flanges are secured to the compensating hopper and follow the latter together with the drum in their rising and falling movements.

The machine according to my invention is provided moreover with a number of detail improvements.

I have shown by way of example and in a somewhat diagrammatical manner one form of execution of my invention in accompanying drawing which is a general vertical cross-sectional view thereof.

According to my invention, the machine comprises a measuring drum constituted by two circular flanges $a$ secured together through radial partitions $b$ disposed perpendicularly to each other and dividing the drum into four equal compartments or buckets. This measuring drum is carried through the agency of ball bearings such as $c$ by a shaft $d$ carried in its turn by the sides of a frame $e$ extending round the drum and pivotally secured to trunnions $f$ carried by the body of the machine. This frame $e$ forms a balance beam and carries, on the side opposed to the drum with reference to the trunnions, an adjustable counterweight $g$.

Above the measuring drum and carried through the shaft thereof through two lateral frames $h$ loosely mounted on said shaft, is disposed the compensating hopper $i$ fed from the upper hopper $j$. To the lower end of the hopper $i$ are secured on one side the flange or cover $k$ extending over part of the periphery of the drum and on the other side the flange or cover $l$ extending over the periphery of the compartment which is being loaded and passing slightly beyond and underneath the partition forming the underside of this compartment. Thus this compartment is completely closed except in front of the lower opening of the compensating hopper $i$ with which it is in communication. But it is automatically wide open for unloading as soon as the drum has rotated through a quarter of a revolution and the compartment considered has passed free of the cover $l$. The unloading is thus provided without any closing means moving and the compartment empties much more speedily than with the machines in use heretofore.

The parts of the system are arranged in a manner such that when the drum is stationary, the compensating hopper unloads into a compartment of the measuring drum to one side of the vertical axial plane, whereupon the weight of the material filling said compartment urges the drum $a$ into rotation. But as long as the drum remains in its upper position by reason of the action of the counterweight $g$, such a rotary motion is prevented by a guide roller $r'$ engaging the recessed portion $s'$ of the groove $s$ formed in a fixed cam $t$. In this position the gate $m$ of the distributing hopper $j$ is raised by the compensating hopper $i$ against the edge of which the projection $n$, of the arm $n$ carrying the gate $m$ bears. The material being measured out, flows consequently into the hopper $i$ and thence into the compartment of the measuring drum just underneath it. The arrangement comprising the drum and the hopper at a given moment equilibrates the counterweight $g$ which causes the whole to rock round the trunnions $f$. Due to this movement, the drum $a$ is lowered and the guide roller $r'$ engages the leading portion $s^2$ of the groove $s$ in the cam $t$, whereupon the drum being free, rotates through a quarter of a revolution until the following guide roller $r^2$ engages the adjacent section of the cam groove $s$ and butts against the recessed portion $s'$ of said groove after mounting the steep portion $s^3$ thereof which breaks and stops the rotating movement of the drum in forcing the latter upwardly. At this moment the compartment considered has moved away from the cover $l$ and is thus wide open. It empties completely and speedily its contents whereupon the rocking arrangement rises and operation is resumed.

During rotation the compartment which has just been filled is levelled by the rear edge of the discharge opening of the hopper $i$ which is parallel to the drum shaft, at the upper edge of the cover $l$ and no brush is therefore required.

What I claim is:

1. In a distributing machine, the combination of a horizontal rotary drum provided with wide open compartments, a hopper adapted to feed the compartments as they pass in succession underneath it when the drum rotates, a shaft disposed axially of the drum and carrying the hopper, covers secured to the hopper and extending over the entire upper half of the periphery of the drum except in front of the discharge opening of the hopper and means for locking the drum against rotation as long as the weight of material in each successive compartment is under a predetermined value.

2. In a distributing machine, the combination of a horizontal drum constituted by two end flanges and radial partitions connecting them together, a hopper adapted to feed the compartments formed between two successive partitions as they pass in succession underneath it when the drum rotates, a shaft disposed axially of the drum and on which are freely mounted the drum and the hopper, the hopper remaining constantly at the same height above the shaft, a counterweight, a part adapted to rock under the action of the varying difference of weight between the counterweight and the drum, hopper and shaft system and carrying said counterweight and system, covers secured to the hopper and extending over the entire upper half of the periphery of the drum except in front of the discharge opening of the hopper and means for locking the drum against rotation as long as the drum, hopper and shaft system is in its raised position.

3. In a distributing machine as claimed in claim 2, the provision of means for stopping the feed of material into the hopper when the drum, hopper and shaft system is not in its raised position.

In witness whereof I have hereunto set my hand.

ALFRED HANIQUE.